United States Patent
Younge (10) Patent No.: US 11,838,611 B1
(45) Date of Patent: Dec. 5, 2023

(54) VEHICLE DISPLAY DEVICE WITH SIMULATED MIRROR AND WIRELESS CONNECTIVITY

(71) Applicant: T-Mobile USA, Inc., Bellevue, WA (US)

(72) Inventor: Mark Younge, Golden, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 349 days.

(21) Appl. No.: 17/346,025

(22) Filed: Jun. 11, 2021

(51) Int. Cl.
- *B60R 1/00* (2022.01)
- *H04N 23/53* (2023.01)
- *H04N 7/18* (2006.01)
- *B60R 25/30* (2013.01)

(52) U.S. Cl.
CPC ............. *H04N 23/531* (2023.01); *B60R 1/00* (2013.01); *B60R 25/305* (2013.01); *H04N 7/181* (2013.01); *B60R 2300/105* (2013.01); *B60R 2300/20* (2013.01); *B60R 2300/30* (2013.01)

(58) Field of Classification Search
CPC ........ H04N 23/531; H04N 7/181; B60R 1/00; B60R 25/305
USPC ......................................................... 348/115
See application file for complete search history.

(56) References Cited

U.S. PATENT DOCUMENTS

| | | |
|---|---|---|
| 5,899,956 A | 5/1999 | Chan |
| 6,447,128 B1 | 9/2002 | Lang et al. |
| 6,690,268 B2 | 2/2004 | Schofield et al. |
| 6,980,092 B2 | 12/2005 | Turnbull et al. |
| 7,412,328 B2 | 8/2008 | Uhlmann et al. |
| 7,564,479 B2 | 7/2009 | Schedivy |
| 7,586,666 B2 | 9/2009 | McCabe et al. |
| 7,619,508 B2 | 11/2009 | Lynam et al. |
| 7,697,027 B2 | 4/2010 | McMahon et al. |
| 7,719,408 B2 | 5/2010 | Deward et al. |
| 7,855,755 B2 | 12/2010 | Weller et al. |
| 7,937,667 B2 | 5/2011 | Kramer et al. |
| 8,066,415 B2 | 11/2011 | Pastrick et al. |
| 8,288,711 B2 | 10/2012 | Heslin et al. |
| 9,661,280 B2 | 5/2017 | Riad et al. |
| 9,676,336 B2 | 6/2017 | Peterson et al. |
| 9,712,741 B2 | 7/2017 | Kothari |
| 9,725,048 B2 | 8/2017 | Heinemann |
| 2004/0267419 A1 | 12/2004 | Jeng |
| 2005/0162513 A1 | 7/2005 | Chan |
| 2007/0064108 A1 | 3/2007 | Haler |

FOREIGN PATENT DOCUMENTS

| | | |
|---|---|---|
| CN | 105034951 A | 11/2015 |
| CN | 104408989 B | 10/2016 |
| CN | 106314290 A | 1/2017 |

(Continued)

*Primary Examiner* — Nguyen T Truong
(74) *Attorney, Agent, or Firm* — Perkins Coie LLP (57) ABSTRACT

A vehicle system includes a display device that simulates a rear-facing mirror (e.g., rearview mirror). The display device displays a first video captured by a first camera to simulate the rear-facing mirror. The system detects a change in an orientation of the display device from a first orientation to a second orientation and, in response, causes the display device to display a second video captured by a second camera to maintain the simulation of the rearview mirror but from the second orientation. Alternatively, the system causes a corresponding change in the perspective of the first video being displayed on the display device thereby maintaining the effect of the rearview mirror.

20 Claims, 7 Drawing Sheets

(56) References Cited

FOREIGN PATENT DOCUMENTS

| | | | |
|---|---|---|---|
| CN | 107021019 | A | 8/2017 |
| CN | 108162859 | B | 4/2020 |
| DE | 202014102731 | U1 | 6/2014 |
| EP | 2925566 | A1 | 10/2015 |
| WO | 2009023614 | A1 | 2/2009 |
| WO | 2016044820 | A1 | 3/2016 |

VEHICLE DISPLAY DEVICE WITH SIMULATED MIRROR AND WIRELESS CONNECTIVITY

BACKGROUND

A vehicle typically includes one or more mirrors to assist a driver. Examples include a rearview mirror and a wing or sideview mirror. A rearview mirror is a flat mirror in automobiles and other vehicles, designed to allow the driver to see rearward through the vehicle's rear window. In cars, the rearview mirror is usually affixed to the top of the windshield on a double-swivel mount allowing it to be adjusted to suit the height and viewing angle of any driver and to swing harmlessly out of the way if impacted by a vehicle occupant in a collision. The rearview mirror is augmented by one or more sideview mirrors, which serve as the only rear-vision mirrors on trucks, motorcycles, and bicycles.

A type of rearview mirror includes a day/night mirror that can be tilted to reduce the brightness and glare of lights, mostly for high-beam headlights of vehicles behind which would otherwise be reflected directly into the driver's eyes at night. On versions that manually tilt, a tab is used to adjust the mirror between "day" and "night" positions. A sideview mirror is placed on the exterior of vehicles for the purpose of helping a driver see areas behind and to the sides of the vehicle, outside the driver's peripheral vision (the "blind spot"). The side mirror is equipped for manual or remote vertical and horizontal adjustment so as to provide adequate coverage to drivers of differing height and seated position.

Modern cars include rearview video cameras. This is partially in response to the inability of rearview mirrors to show the road directly behind the car, due to the rear deck or trunk obscuring the road behind the car. The cameras are mounted to the rear bumper or lower parts of the car, allowing for better rear visibility. The video captured from a rearview camera can be displayed on a display device of a dashboard. A driver can use the dashboard display when reversing the car to aid in avoiding a collision. In another example, a dashcam captures video on a loop. Once an accident is detected, the dashcam keeps the video in storage for later review by authorities. Thus, video cameras merely replace or augment the functions of vehicle mirrors during limited operations and for limited purposes.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a display device for a vehicle. The display device simulates a mirror and includes wireless connectivity. The display device can display images such as video captured by one or more internal camera devices or other types of imaging devices. The wireless connectivity allows the display device to connect with external imaging devices and/or wireless systems with resources external to the display device such as a wireless telecommunications system. A system that includes the display device and at least one imaging device is referred to herein as a "vehicle system." The display device is referred to herein synonymously as a "smart mirror" that simulates a mirror and can provide additional functions that augment the basic function of simulating the mirror. In some embodiments, the smart mirror completely replaces (e.g., obviates the need for) any reflective surface of a mirror.

The smart mirror has physical dimensions similar to conventional vehicle mirrors and is configured to position in the same locations and allow drivers to physically interact with the mirrors in a manner similar to the conventional vehicle mirrors. For example, a smart mirror can resemble a rearview mirror near the windshield and within the field-of-view (FoV) of the driver. The smart mirror communicatively couples to one or more imaging devices (e.g., cameras) positioned on the vehicle and facing in one or more directions away from the vehicle (e.g., rear-facing). In one example, the simulated mirror displays real-time images captured by a camera to simulate the view of a standard rearview mirror. The real-time images are optionally communicated via a wireless transceiver of the camera to a wireless transceiver of the rearview mirror. Hence, the smart mirror can completely replace (e.g., obviate the need for) a vehicle mirror or other reflective surface that has a similar function.

The smart mirror is an automotive accessory that can replace a conventional vehicle mirror and additionally provide advanced highway safety features, communications, surveillance, and other automotive services. In some embodiments, the smart mirror incorporates communications technology such as connectivity for 5G, Bluetooth, and/or WiFi, and utilizes advanced computing technologies (e.g., smartphone apps) and communication services to monitor a vehicle's operation and external environment for potential problems or threats while driving or parked. The smart mirror can comply with standards such as 3GPP standards.

In an example, one or more rearview cameras capture video, optionally transmit it wirelessly to the smart mirror, and cause the video to be displayed in real-time on the smart mirror to seamlessly and continuously simulate a rearview point-of-view (POV) and dynamically update the video as a function of an orientation of the smart mirror and/or the driver. Specifically, the smart mirror displays video captured in real-time by a camera. The system detects a change in an orientation of the smart mirror or the driver from a first orientation to a second orientation. For example, the system can detect that the driver tilted the mirror up, down, left, or right to see a different perspective or object(s). In response to the detected change in the smart mirror's orientation, the system causes the smart mirror to change the display to another video captured by another camera to maintain the simulation of the mirror but from the new orientation. In another example, the smart mirror can digitally or manually change the perspective of the same video or camera to present the video based on the new orientation and thereby continuously maintain the simulation. As such, the rendering of the captured video changes rather than changing the originally captured video.

In another example, the smart mirror is a handheld mobile device (HMD) that can be positioned to operate like a rearview mirror that interconnects with wirelessly with cameras or other sensors positioned on the vehicle. For example, a smartphone can wirelessly connect to the cameras and the vehicle's computer systems (e.g., via Bluetooth). The smartphone can be secured in a location near the windshield to operate like the smart mirror described herein.

The smart mirror can include other features that augment the mirror simulation. For example, the smart mirror can connect to a LiDAR or radar system, or use artificial intelligence (AI) or machine learning (ML) and other technologies to alert a driver of potential hazards such as tailgaters, speeders, lane changers, etc. In addition to alerting the driver, the smart mirror can upload captured video associated with a detected hazard or accident to a cloud storage for transmission to public safety officials and other related entities.

In another example, when a vehicle is not moving, the smart mirror can operate as a security system to detect a carjacking, theft, vandalization attempts, or to authenticate a driver and alert the owner and or summon police when malicious issues are detected. In yet another example, the smart mirror can connect to a vehicle's on-board diagnostics (OBD) device to monitor a vehicle's overall mechanical functions, performance, and provide real-time diagnostics for a repair shop. The smart mirror can also provide voice command recognition or integrate Amazon Alexa and/or Google voice recognition technology to allow for hands free operation and access to information. In an example of a particular use case, the smart mirror can detect and monitor a teen driver to track navigation and monitor safety metrics and detect whether the teen arrived past a curfew or had an accident on her way home. Accordingly, the smart mirror improves the safety of the vehicle. Additional details, features, and implementations are described further below.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
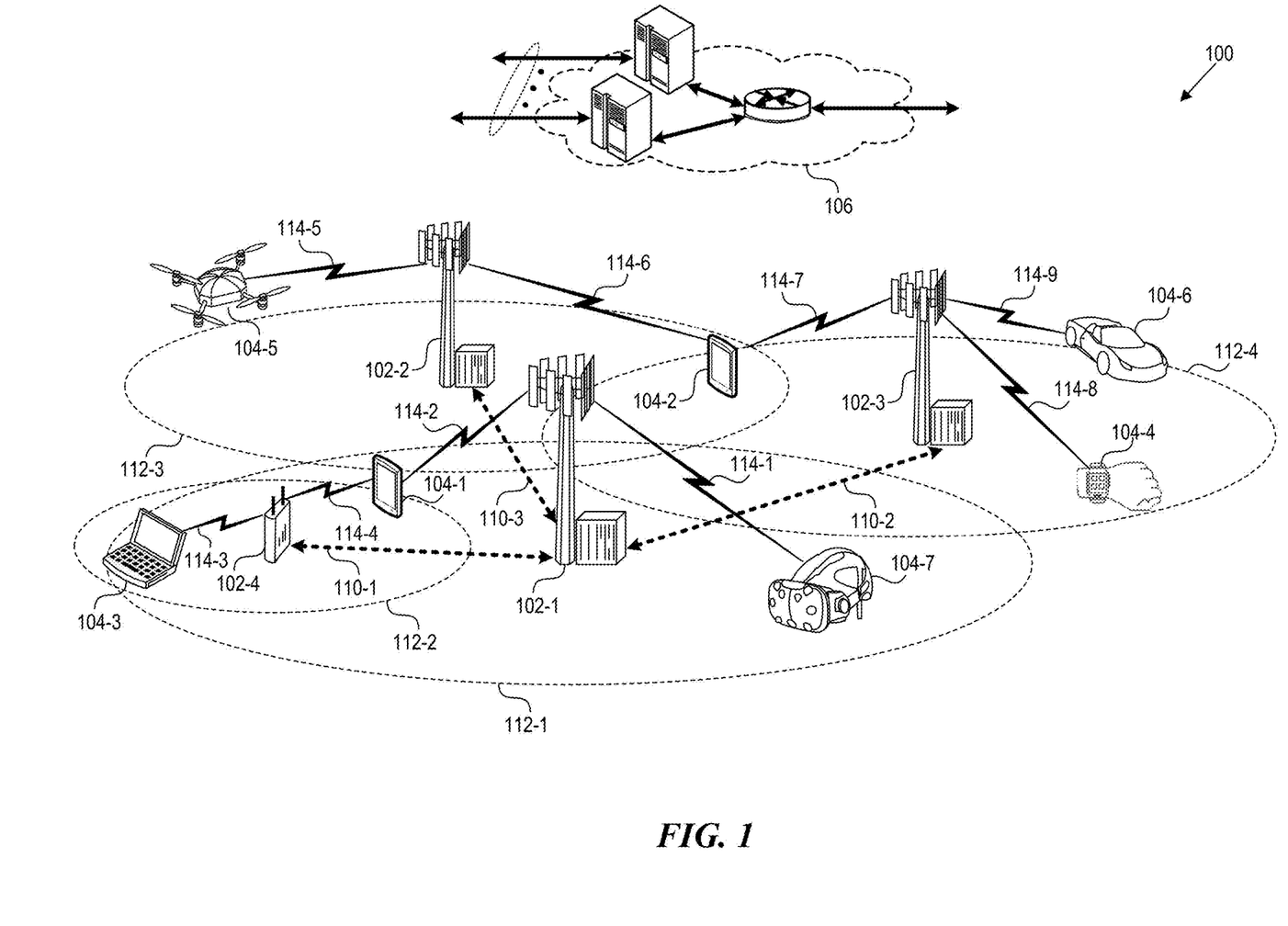
FIG. 1 is a block diagram that illustrates a wireless communications system.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a mirror device in a vehicle (e.g., wireless device 104-6), an augmented reality/virtual reality (AR/VR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Vehicle System with Smart Mirror

Figure 2:
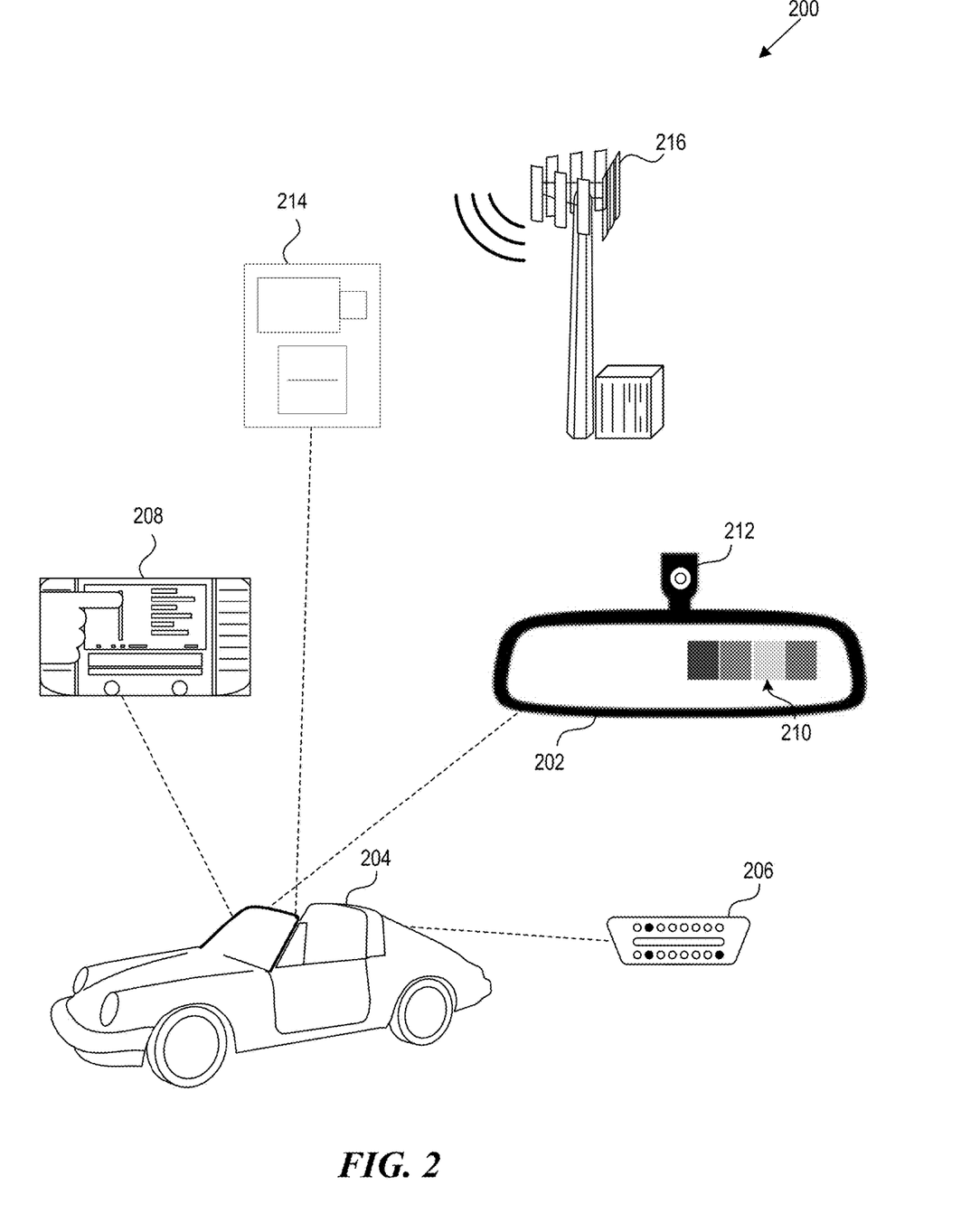
FIG. 2 illustrates a system of a vehicle including a display device configured to simulate a mirror ("smart mirror").

FIG. 2 illustrates a vehicle system 200 ("system 200") including a display device 202 ("smart mirror 202") configured to simulate a mirror. The system 200 interconnects the smart mirror 202 with other vehicle components and external communication systems to provide advanced functionality for the driver of the vehicle 204. In some examples, the smart mirror 202 is integrated into the vehicle 204 through an interface such as an OBD port.

Examples of the vehicle 204 include a passenger automobile, truck, boat, or any other vehicle that has a data link connector through which the smart mirror 202 can communicatively couple to the vehicle's on-board computer(s). For example, an OBD connector 206 can allow access to various systems and subsystems of the vehicle 204 through a wireless adapter. The vehicle 204 could also have a console 208 that includes functions accessible through a user interface (UI), which could include a touch-sensitive surface. Examples of the console functions include vehicle navigation, audio, video, and short-range wireless connectivity.

The smart mirror 202 can include a processor and memory storing software instructions that, when executed by the processor, cause the smart mirror 202 to perform one or more functions. For example, a function can cause display of objects 210 such as video or graphics on the smart mirror 202. The smart mirror 202 can include a camera device 212 that captures video, which is simultaneously presented on the smart mirror 202 to simulate a reflection (e.g., a mirror).

In one example, the smart mirror 202 runs a software application ("app") that overlays a UI for a human driver on the simulated mirror. The driver can interact with the UI through a touch-sensitive surface of the smart mirror 202. In another example, the smart mirror 202 uses a display of the console 208 to extend its functions or allow the console 208 to extend its functions to the smart mirror 202.

The smart mirror 202 can include other processor-implemented functionality to engage in bi-directional communications with the vehicle's on-board computer(s) via Bluetooth, Wi-Fi, 5G, or any other wireless or wired communications protocols. For example, the software running on the smart mirror 202 can exchange information with the console 208 and with the vehicle's on-board computer(s) via the OBD connector 206.

The smart mirror 202 can communicatively connect to one or more other sensors 214. Examples of the sensors 214 include one or more camera devices and/or a LiDAR sensor that can provide situational awareness with regard to the vehicle or the driver. The smart mirror 202 can access other functionality within the ambit of the processor such as geolocation information provided by a GPS system, or data or services provided through a telecommunications network node 216.

In some embodiments, the software running on the smart mirror 202 includes various program sequences that, in response to user input or output from the sensors 214, cause the smart mirror 202 to process sensor data, receive geolocation information, determine the vehicle 204's location, speed, identify driving hazards, etc. The smart mirror 202 can also receive additional information about the vehicle 204 from the OBD connector 206. Examples of the information includes speed, acceleration, and braking data. Based on this information, the smart mirror 202 can generate both display signals and control signals for the driver and vehicle 204. For example, the smart mirror 202 can augment driver-assist functions by detecting a hazard captured in a video (e.g., drunk driver) and, in response, communicate a control signal to other components of the vehicle 204, via the OBD connector 206, to alert the human driver to apply brakes, accelerate, change lanes, etc.

Figure 3:
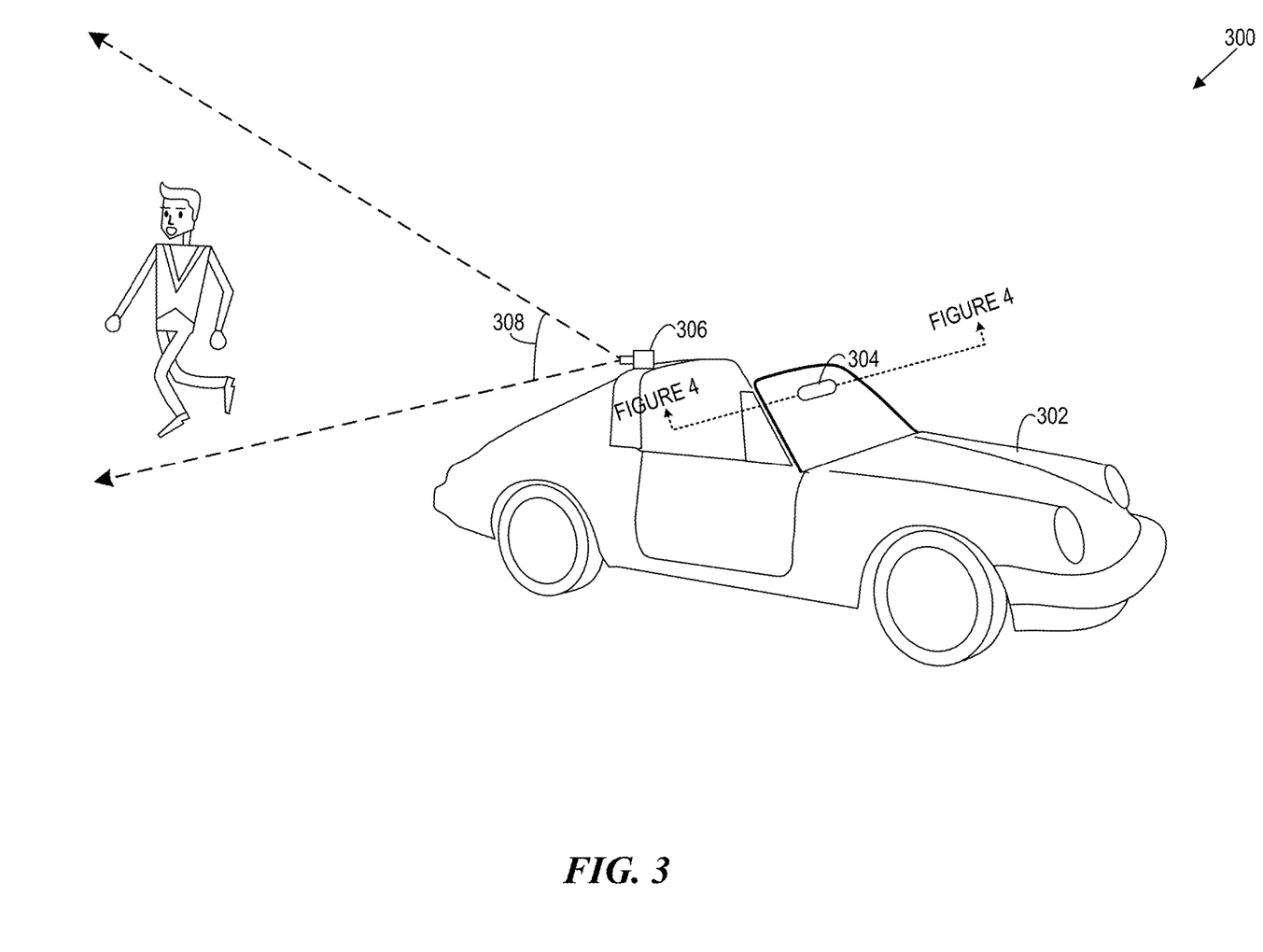
FIG. 3 illustrates a perspective view of a vehicle including a smart mirror and imaging devices that capture videos for display on the smart mirror.

FIG. 3 illustrates a perspective view 300 of a vehicle 302 including a smart mirror 304 and one or more imaging devices that capture video for display on the smart mirror 304. As shown, the smart mirror 304 is positioned on or near the windshield of the vehicle 302. The imaging device 306 is mounted toward the rear of the vehicle 302. The imaging device 306 can scan a range 308 that encompasses objects in the rear of the vehicle. The imaging device 306 can capture images of the rearview environment in real-time to enable the smart mirror 202 to simulate a rearview mirror.

The captured images can aid a driver of the vehicle 302 like a conventional rearview mirror. As such, the smart mirror 304 and the imaging device 306 are collectively part of a driver-assist system. As shown, the imaging device 306 has within its range 308 a person walking behind the vehicle 302. In one example, the imaging device 306 can use video or LIDAR data obtained through the imaging device 306 to, for example, cause the vehicle 302 to avoid striking the person, along with presenting a simulated rearview image, which includes the person, on the smart mirror 304.

Figure 4:
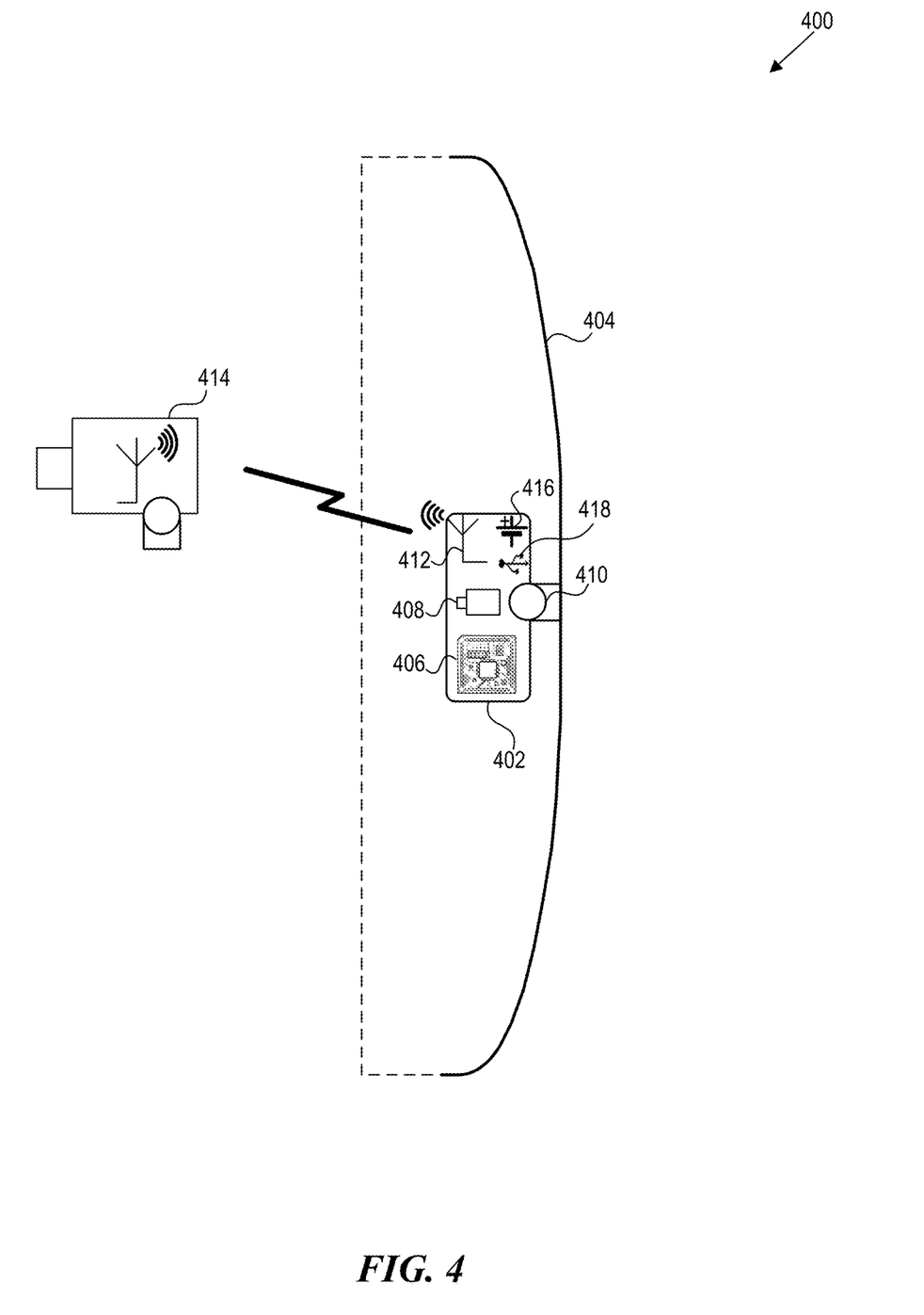
FIG. 4 illustrates a cutaway view of a system of a vehicle including a smart mirror mounted on or near a windshield and an imaging device that captures images for display on the smart mirror.

FIG. 4 illustrates a cutaway view of a vehicle system 400 including a smart mirror 402 mounted to or near a windshield 404 of a vehicle (e.g., vehicle 302). The smart mirror 402 houses electronic components 406 (e.g., processor, memory) and can include a rear-facing imaging device 408 configured to capture or generate images (e.g., a camera that captures video). The smart mirror 402 is mounted on a mounting assembly 410 that is configured to position the smart mirror 402 in a rear-facing orientation. The housing of the smart mirror 402 is movable relative to the mounting assembly 410. In one example, the processor of the electronic components 406 ("the processor") is configured to cause the smart mirror 402 to display captured video and change the display or a perspective thereof based on a change in the orientation of the smart mirror 402.

The vehicle system 400 includes a communications interface 412 configured to communicate data between the smart mirror 402 and other electronic devices of the vehicle and/or electronic devices accessible over a wireless network such as a 5G network. The communications interface 412 can connect to other types of networks such as Bluetooth, WiFi, etc. The vehicle system 400 can communicate and process data received over the wireless network. For example, the vehicle system 400 can capture sensor data indicative of the driver's behavior (e.g., driving at an excessive speed) and communicate that data over the wireless network to a remote server. The remote server can use the sensor data for a model in accordance with an artificial intelligence or machine learning technique. The remote server can then provide feedback to alert a driver of a potential driving hazard that is based on output of the model.

In one example, the communications interface 412 receives a video feed from a remote imaging device 414 positioned elsewhere on the vehicle. The imaging device 414 can wirelessly couple to the smart mirror 402 through the communications interface 412. In another example, the remote imaging device 414 can couple to the display device through the communications interface over a wired network. As such, the communications interface 412 can feed captured video from the remote imaging device 414 to the smart mirror 402 in real-time to display another video or perspective thereof for the simulated mirror. In another example, the communications interface 412 can communicate wirelessly with a handheld mobile device (HMD) such as a smartphone. The memory of the electronic components 406 ("the memory") can store software instructions that, when executed by the processor, causes the processor to process data communicated between the smart mirror 402 and the smartphone.

The remote imaging device 414 is coupled to another mounting assembly that is configured to position the remote imaging device 414 in a rear-facing orientation. As such, the processor of the smart mirror 402 can cause display of a video captured by the imaging device 408 at the display device or another video captured by the remote imaging device 414, depending on the orientation of the smart mirror 402. As such, presentation of the videos captured by the imaging devices 408 and 414 can synchronize with an orientation of the smart mirror 402.

As shown, the housing of the smart mirror 402 is shaped as a rearview mirror and the mounting assembly 410 is configured to mount to an interior of the vehicle such as the roof or directly on the windshield 404. However, embodiments of the disclosed technology are not limited to simulate a rearview mirror. For example, a housing could be shaped as a sideview mirror of the vehicle where its mounting assembly is configured to mount the display device to an exterior of the vehicle.

The smart mirror 402 also includes a power source 416 or battery and a port 418 operable to communicatively couple the processor of the electronic components 406 to an on-board computer of the vehicle via an existing data link connector of the vehicle. The memory stores software instructions that, when executed by the processor, causes the vehicle system to communicate a command to the on-board computer. For example, the command can cause the vehicle to perform an action that affects navigation of the vehicle (e.g., brake, accelerate). In another example, the processor can process data received from the on-board computer. The received data can cause the smart mirror 402 to present an alert indicating a condition affecting navigation of the vehicle. In one implementation, the smart mirror 402 can superimpose a computer-generated graphic or image on the display of the captured video to provide an augmented reality view of the simulated mirror. For example, a simulated mirror on the smart mirror 402 can include navigation objects (e.g., guidance arrows) that overlay the captured video. In another example, the smart mirror 402 displays a view behind a trailer being towed by the vehicle, where the camera providing the video feed is suitably positioned on or behind the trailer.

In one example, the memory stores software instructions that, when executed by the processor, cause the system 400 to authenticate an image of a driver in the captured video. The smart mirror 402 can communicate a command via the communications interface 412 to the on-board computer based on the authentication. The command can cause the vehicle to perform or not perform an action affecting navigation. For example, facial recognition software can be used to authenticate a driver to start the engine or an unauthenticated driver can cause the vehicle to trigger an alarm.

In another example, the communications interface 412 can communicate over a wireless network communicatively coupled to a remote computer system operated by a public safety entity (e.g., police station). The memory can store video captured by a camera device (e.g., remote imaging device 414). The system 400 can upload the recorded video to the remote computer system in response to detection of a hazard such as a potential carjacking. In another example, the vehicle system 400 can activate a security software that is configured to detect intrusion or potential damage to the vehicle based on video data captured by the system 400. In one example, the security software is activated in response to the vehicle being parked and turned off. In another example, the security software remains active while the vehicle is being operated by a driver.

In another example, the vehicle system 400 includes a LIDAR system with laser and detector assemblies, as well as power and data communication mechanisms. A laser and detector assembly can include a light source operable to emit light toward an object in an environment relative to the vehicle, and a light detector can receive at least a portion of the light reflected off the object. This data can be used to determine a distance to an object relative to the vehicle.

The vehicle system 400 can include other components that are not shown herein for the sake of brevity but provide additional functionality. For example, the smart mirror 402 can include a microphone for processing spoken utterances from a driver or passenger of the vehicle. The memory can store voice recognition software that, when executed by the processor, causes the vehicle system to process voice commands received at the microphone.

Figure 5:
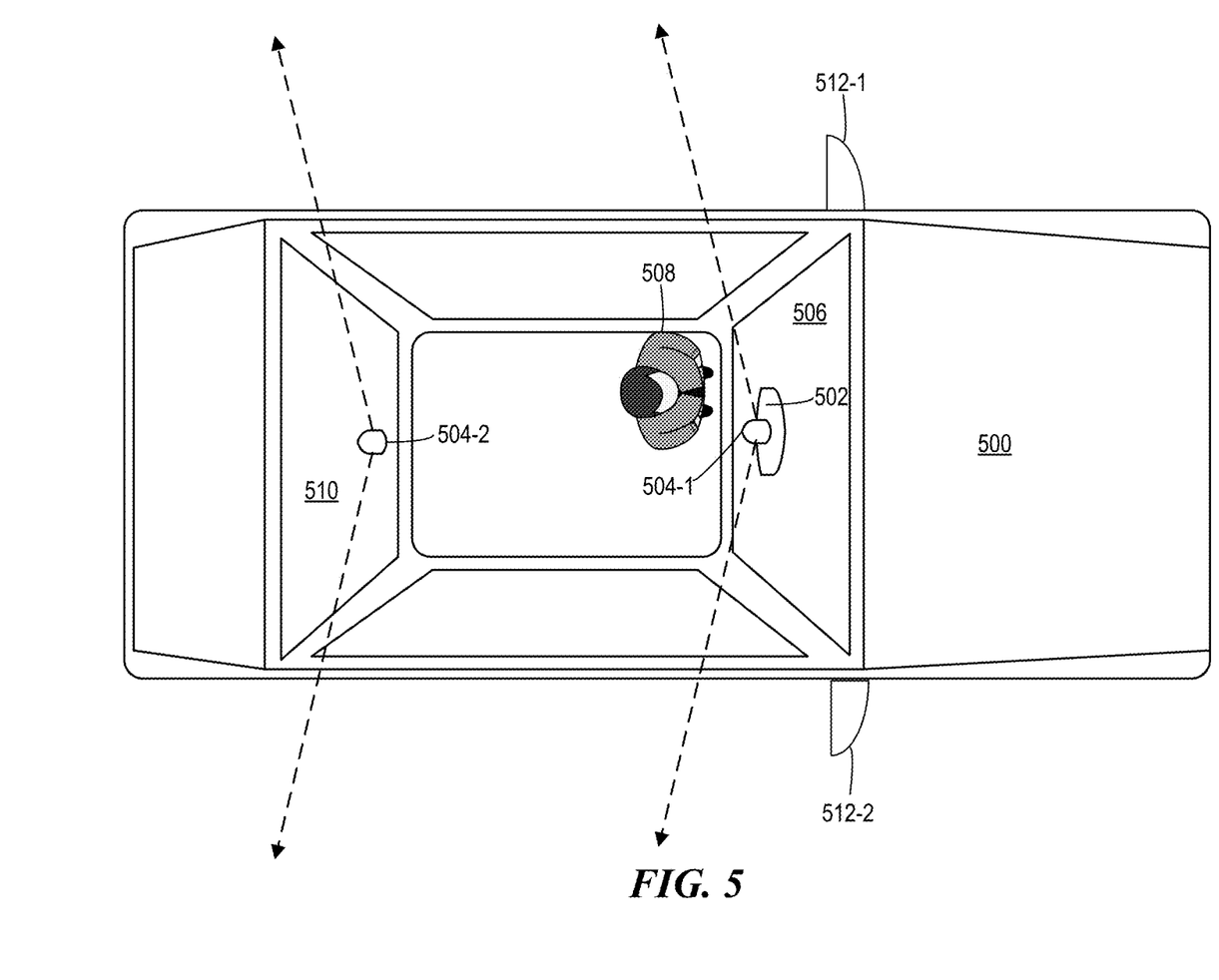
FIG. 5 is a block diagram that illustrates a vehicle including a smart mirror and multiple imaging devices at their relative positions.

FIG. 5 is a block diagram that illustrates a vehicle 500 including a smart mirror 502 and multiple imaging devices 504-1 and 504-2 (collectively referred to as "imaging devices 504") at their relative positions. The vehicle 500 has a front windshield 506 with an interior surface on which the smart mirror 502 can be mounted to face a driver 508. The smart mirror 502 is coupled to the imaging device 504-1 that likewise faces the driver 508. The vehicle 500 includes a rear windshield 510 with an exterior surface on which an imaging device 501-2 can be mounted. The smart mirror 502 and imaging device 504 are each a rear-facing device, relative to the front of the car. The vehicle 500 can also or alternatively have sideview devices 512-1 and 512-2 that are smart mirrors.

The imaging devices 504 and their illustrated locations are merely examples. The vehicle 500 can include imaging devices or sensors mounted anywhere on the vehicle 500 or receive sensor data over a wireless telecommunications network from a remote system. The imaging devices 504 capture different rear-facing views that are within the driver 508's FoV. In one example, the vehicle 500 has an array of imaging components oriented in many different directions. The array of imaging components can simultaneously collect data (e.g., capture images) within their respective ranges of the environment. The data collected by the array of sensors can include images or data that is used to digitally construct a representation of the environment. For example, an array of cameras can scan a video of the environment relative to the vehicle 500, and an infrared sensor can scan an area to detect temperature differences. As such, the data can be collectively used to simulate a mirror and include augmented functionality such as night vision.

In some embodiments, the vehicle 500 includes a central management component configured to control an array of sensors that enable the smart mirror 502 to display information that assists the driver. For example, the central management component can establish wireless communication links with other components of the vehicle, other vehicles, or a wireless network that connects to remote computing systems and services.

Figure 6:
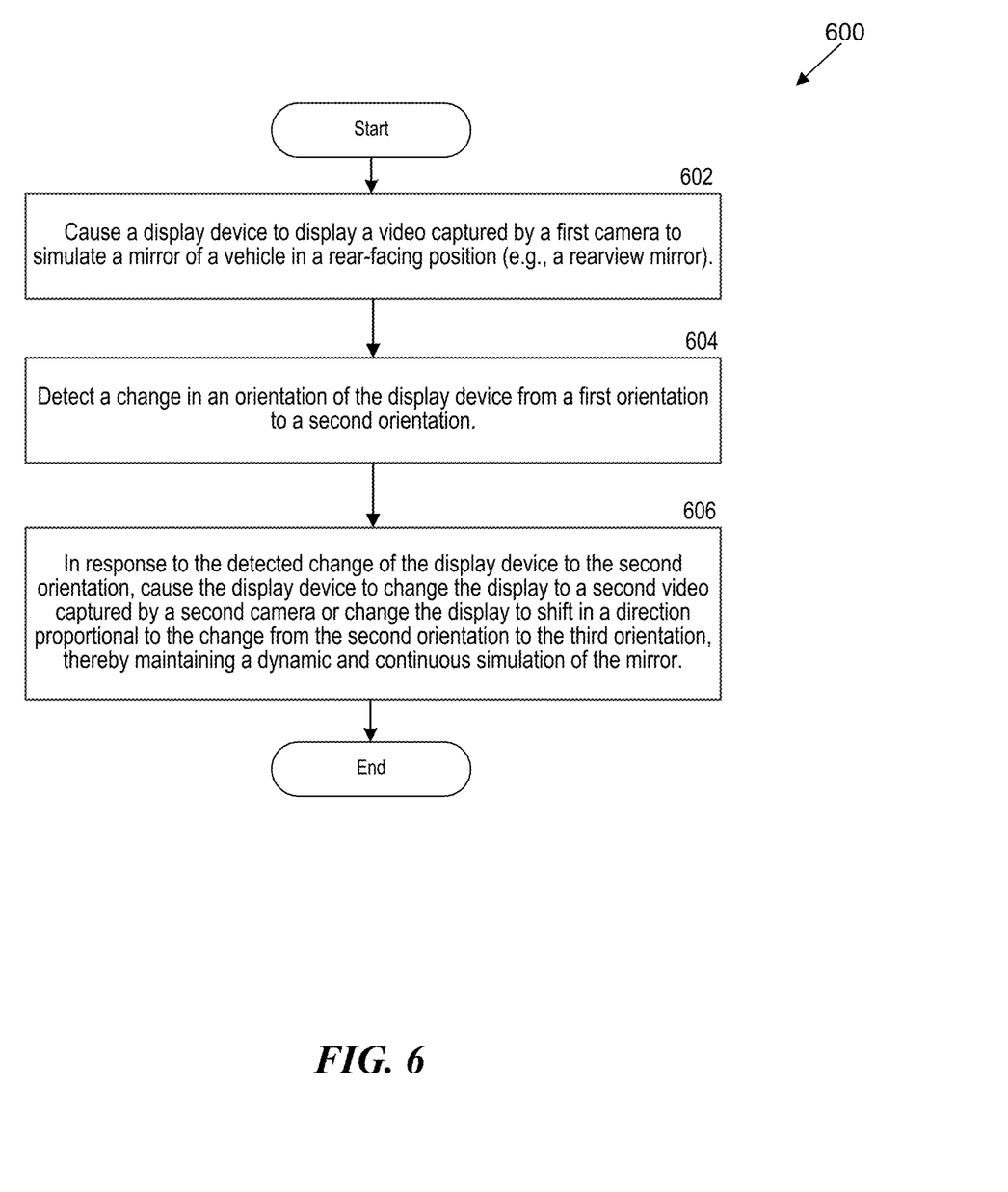
FIG. 6 is a flowchart that illustrates a process performed by a system of a vehicle that simulates a mirror.

FIG. 6 is a flowchart that illustrates an example of a process 600 performed by a vehicle system to simulate a mirror. In other words, the process 600 is perform by a smart mirror and one or more imaging devices that are interconnected to dynamically simulate a mirror.

At 602, the system causes the smart mirror to display a first video captured by a first camera to simulate a rearview mirror or a sideview mirror. The video can be continuously captured and displayed for the driver in real-time to provide the simulated mirror effect. The system can also capture videos from multiple other camera devices. The videos can be captured simultaneously or as needed for the display on the smart mirror. In some implementations, the cameras can move and/or rotate as needed to provide a perspective that is synchronized with an orientation of the smart mirror.

At 604, the system detects a change in an orientation of the smart mirror from a first orientation to a second orientation. For example, the system can detect that the smart mirror is facing a first direction and is then re-oriented by the driver to face an orientation at a different angle. The system can detect the change in the orientation and the new angle relative to the prior angle in which the smart mirror is oriented.

At 606, in response to the detected change of the smart mirror to the second orientation, the system causes the smart mirror to change the display to a second video captured by a second camera to maintain the simulation of the smart mirror but from the second orientation. In another example, the system responds by changing the display to shift in a direction proportional to the change to a new orientation, thereby maintaining a dynamic and continuous simulation of the mirror by using the same camera. For example, the video being presented on the smart mirror can be digitally morphed to show an angle that corresponds to a new angle of orientation for the smart mirror. In another example, the camera that captures the video is physically moved to compensate for the change in the orientation of the smart mirror.

In another example, a camera facing the driver can track the eye-movement or head movement of the driver to determine which video feed to display on the smart mirror and/or which angle of the video feed to display on the smart mirror. The system can activate the simulated mirror or increase the illumination of the simulated mirror when the driver is looking at the simulated mirror and otherwise conserves energy.

Computer System

Figure 7:
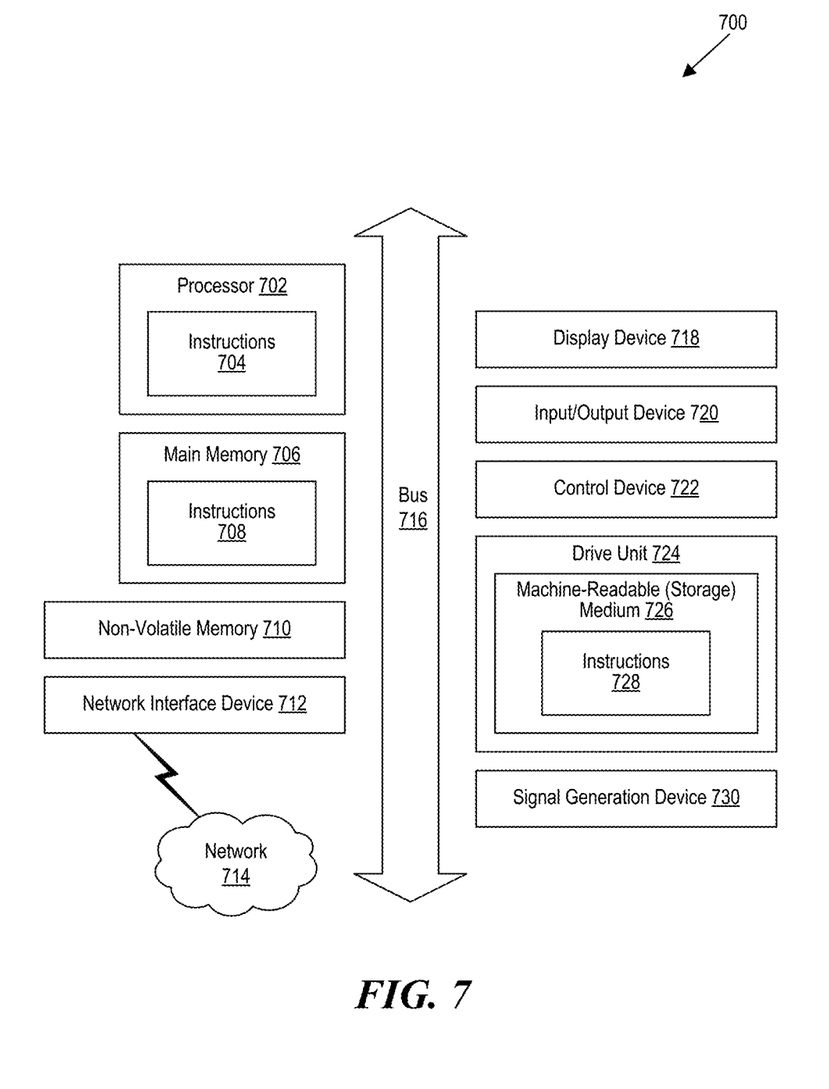
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A vehicle system comprising:
  a housing including:
    a display device; and
    a processor;
  a camera device securable to a vehicle and configured to capture a video;
  a mounting assembly configured to position the display device in a rear-facing orientation and positionable to be viewable by a driver of the vehicle,
    wherein the housing is movable relative to the mounting assembly, by the driver,
    wherein the processor is configured to simulate a mirror on the display device by causing the display device to display the captured video and to, based on a change in an orientation of the housing:
      dynamically switch between captured videos for display on the display device, or
      change a rendering of a perspective of the captured video on the display, and
    wherein the change in the orientation of the housing includes tilting the display device up, down, left, or right.

2. The vehicle system of claim 1, wherein the camera device is a first camera device, the captured video is a first captured video, and the mounting assembly is a first mounting assembly, the vehicle system further comprising:
  a second camera device configured to capture a second video,
  a second mounting assembly configured to position the second camera device in a rear-facing orientation,
    wherein the processor is configured to cause the display device to display the first video or the second video depending on the orientation of the display device.

3. The vehicle system of claim 1, wherein the camera device is apart from the housing, the vehicle system further comprising:
  a communications interface configured to feed the captured video in real-time from the camera device to the display device.

4. The vehicle system of claim 1, wherein the camera device is integrated in the housing including the display device and is synchronized with the orientation of the housing such that display of captured video dynamically adapts to the orientation of the display device.

5. The vehicle system of claim 1, wherein the housing is shaped as a rearview mirror for a vehicle and the mounting assembly is configured to mount the housing to an interior of a windshield of the vehicle.

6. The vehicle system of claim 1, wherein the housing is shaped as a sideview mirror of a vehicle and the mounting assembly is configured to mount the housing to an exterior of a driver's side door of the vehicle.

7. The vehicle system of claim 1, wherein the display device is configured to superimpose a computer-generated graphic or image on the display of the captured video to provide an augmented reality view of the simulated mirror, and wherein the computer-generated graphic or the image includes an indication for navigating the vehicle.

8. The vehicle system of claim 1 further comprising:
  a port operable to communicatively couple the processor to an on-board computer of a vehicle via a data link connector of the vehicle; and
  a memory storing software instructions that, when executed by the processor, causes the vehicle system to communicate a command to the on-board computer, wherein the command causes the vehicle to perform an action that affects navigation of the vehicle, and wherein the action includes causing a change in acceleration of the vehicle.

9. The vehicle system of claim 1 further comprising:
a port operable to communicatively couple the processor to an on-board computer of the vehicle via a data link connector of the vehicle; and
a memory storing software instructions that, when executed by the processor, causes the vehicle system to:
process data received from the on-board computer, wherein the received data causes the display device to present an alert indicating a condition affecting navigation of the vehicle; and
communicate a command to the on-board computer, wherein the command causes the vehicle to perform an action affecting navigation of the vehicle.

10. The vehicle system of claim 1 further comprising:
a communications interface configured to communicate wirelessly with a handheld mobile device (HMD); and
a memory storing software instructions that, when executed by the processor, causes the vehicle system to process data communicated between the vehicle system and the HMD.

11. The vehicle system of claim 1 further comprising:
a port operable to communicatively couple the processor to an on-board computer of the vehicle via a data link connector of the vehicle; and
a memory storing software instructions that, when executed by the processor, causes the vehicle system to authenticate an image of a driver in the captured video,
wherein a command is communicated to the on-board computer based on the authentication,
wherein the command causes the vehicle to perform or not perform an action affecting navigation of the vehicle, and
wherein the action causes a change in an acceleration of the vehicle.

12. The vehicle system of claim 1 further comprising:
a communications interface configured to communicate with a wireless network,
wherein the wireless network includes a 5G network, a Bluetooth network, or a WiFi network; and
a memory storing software instructions that, when executed by the processor, causes the vehicle system to process data communicated over the wireless network between the vehicle system and a remote computing device,
wherein the data is processed in accordance with a machine learning technique to alert a driver of a potential driving hazard.

13. The vehicle system of claim 1 further comprising:
a memory storing software instructions that, when executed by the processor, causes the vehicle system to activate security software configured to detect intrusion or potential damage to a vehicle based on video data captured by the vehicle system,
wherein the security software is activated in response to the vehicle being parked and turned off.

14. The vehicle system of claim 1 further comprising:
a memory storing software instructions that, when executed by the processor, causes the vehicle system to activate security software configured to detect intrusion or potential damage to a vehicle based on sensor data captured by the vehicle system,
wherein the security software is active while the vehicle is being operated by a driver.

15. The vehicle system of claim 1 further comprising:
a communications interface configured to communicate over a wireless network to a remote computer system operated by a public safety entity; and
a memory configured to record the video captured by the camera device and software instructions that, when executed by the processor, causes the vehicle system to upload the recorded video to the remote computer system in response to detection of a road hazard or accident.

16. The vehicle system of claim 1 further comprising:
a microphone; and
a memory configured to store voice recognition software that, when executed by the processor, causes the vehicle system to process voice commands received at the microphone.

17. A display device for a vehicle comprising:
a first camera disposed on the vehicle in a rear-facing position;
at least one hardware processor; and
at least one computer-readable storage medium, excluding transitory signals and carrying instructions, which, when executed by the at least one hardware processor, cause the display device to:
display a first video captured by the first camera to simulate a rear-facing mirror;
detect a change of the display device from a first orientation to a second orientation; and
in response to the detected change of the display device to the second orientation, cause the display device to change and display a second video captured by a second camera so as to maintain a simulation of the mirror but from the second orientation.

18. The display device of claim 17 further comprising:
a wireless interface,
wherein the second camera is wirelessly coupled to the display device over a wireless network through the wireless interface.

19. A method performed by a vehicle system, the method comprising:
causing a display device to display a first video captured by a first camera to simulate a rearview mirror;
detecting a change in an orientation of the display device from a first orientation to a second orientation; and
in response to the detected change of the display device to the second orientation, causing the display device to change the display to a second video captured by a second camera to maintain the simulation of the rearview mirror but from the second orientation.

20. The method of claim 19 further comprising:
detecting a change in the orientation of the display device from the second orientation to a third orientation; and
in response to detecting the change in the orientation of the display device to the third orientation, causing the display of the second video to shift in a direction proportional to the change from the second orientation to the third orientation.

* * * * *